(12) United States Patent
Rudigier-Voigt et al.

(10) Patent No.: US 11,167,885 B2
(45) Date of Patent: Nov. 9, 2021

(54) PROCESS FOR MAKING A FUNCTIONALIZED HOLLOW BODY, HAVING A LAYER OF GLASS, INCLUDING A SUPERPOSITION OF ONE OR MORE SILOXANES AND CONTACTING WITH A PLASMA

(71) Applicant: Schott AG, Mainz (DE)

(72) Inventors: Eveline Rudigier-Voigt, Mainz (DE); Stephanie Mangold, Klein-Winternheim (DE); Jovana Djordjevic-Reiß, Mainz (DE); Thorsten Schneider, Nackenheim (DE); Andrea Anton, Hüffelsheim (DE)

(73) Assignee: Schott AG, Mainz (DE)

(*) Notice: Subject to any disclaimer, the term of this patent is extended or adjusted under 35 U.S.C. 154(b) by 131 days.

(21) Appl. No.: 16/394,187

(22) Filed: Apr. 25, 2019

(65) Prior Publication Data
US 2019/0329936 A1  Oct. 31, 2019

(30) Foreign Application Priority Data
Apr. 26, 2018 (EP) .................................... 18169607

(51) Int. Cl.
| | |
|---|---|
| *B65D 25/14* | (2006.01) |
| *B32B 17/10* | (2006.01) |
| *C03C 23/00* | (2006.01) |
| *C03C 17/30* | (2006.01) |

(Continued)

(52) U.S. Cl.
CPC ........ *B65D 25/14* (2013.01); *B32B 17/10697* (2013.01); *B32B 17/10798* (2013.01); *B65D 13/02* (2013.01); *C03C 17/005* (2013.01); *C03C 17/30* (2013.01); *C03C 23/006* (2013.01); *B32B 2310/14* (2013.01); *B32B 2383/00* (2013.01);

(Continued)

(58) Field of Classification Search
CPC .. B65D 25/14; B65D 13/02; B32B 17/10697; B32B 17/10798; B32B 2310/14; B32B 2383/00; B32B 2439/60; B32B 2439/80; C03C 23/006; C03C 17/30; C03C 17/005
See application file for complete search history.

(56) References Cited

U.S. PATENT DOCUMENTS

| | | | |
|---|---|---|---|
| 6,537,626 B1 | 3/2003 | Spallek et al. | |
| 8,592,015 B2 | 11/2013 | Bicker et al. | |
| 9,090,503 B2 * | 7/2015 | Sharma | C03C 17/30 |

(Continued)

*Primary Examiner* — Michael C Miggins
(74) *Attorney, Agent, or Firm* — Taylor IP, P.C.

(57) ABSTRACT

A process for making a functionalized hollow body includes: providing a hollow body including a wall which at least partially surrounds an interior volume of the hollow body, the wall including a layer of glass and having a wall surface with a surface region; at least partially superimposing the layer of glass in the surface region with a functionalizing composition precursor on a side of the layer of glass which faces away from the interior volume, the functionalizing composition precursor including one or more siloxanes; and at least partially contacting the functionalizing composition precursor with a plasma, thereby obtaining the functionalized hollow body including a functionalizing composition which at least partially superimposes the layer of glass in the surface region on the side of the layer of glass which faces away from the interior volume.

20 Claims, 10 Drawing Sheets

(51) Int. Cl.
*B65D 13/02* (2006.01)
*C03C 17/00* (2006.01)
(52) U.S. Cl.
CPC ....... *B32B 2439/60* (2013.01); *B32B 2439/80* (2013.01)

(56) References Cited

U.S. PATENT DOCUMENTS

| | | | |
|---|---|---|---|
| 2003/0134060 A1 | 7/2003 | Walther et al. | |
| 2004/0071960 A1* | 4/2004 | Weber | C03C 17/001 |
| | | | 428/336 |
| 2014/0001181 A1* | 1/2014 | Sharma | C03C 17/009 |
| | | | 220/62.15 |
| 2014/0034544 A1* | 2/2014 | Chang | A61J 3/00 |
| | | | 206/524.3 |

* cited by examiner

PROCESS FOR MAKING A FUNCTIONALIZED HOLLOW BODY, HAVING A LAYER OF GLASS, INCLUDING A SUPERPOSITION OF ONE OR MORE SILOXANES AND CONTACTING WITH A PLASMA

BACKGROUND OF THE INVENTION

1. Technical Filed of the Invention

The present invention is directed toward hollow bodies and, more particularly, toward hollow bodies that may be used as pharmaceutical packaging.

2. Background of the Related Art

Containers made from glass have been applied for transporting fluids and powders safely since several centuries. In the last decades, the arts in which glass containers are used for transporting fluids and powders have become increasingly diverse and sophisticated. One such art is the technical field of the present application: pharmaceutical packaging. In the pharmaceutical industry, glass containers—such as vials, syringes, ampules and cartridges—are applied as primary packaging for all kinds of pharmaceutically relevant compositions, in particular drugs, such as vaccines. Specifically in this art, the requirements put on the glass containers have recently become more and more sophisticated.

Glass containers for pharmaceutical packaging are typically cleaned, sterilized, filled and closed, on an industrial scale in a line of processing, referred to as filling line herein. There is a need to increase a production rate of such a filling line in the art. This may be implemented by increasing a velocity of the filling line and/or by reducing shut down times due to disruptions of the processing. In the prior art, such disruptions are typically caused by the occurrence of breakage of glass containers during processing, in particular due to high transportation velocities on the filling line. If such breakage occurs, production has to be stopped, the line has to be cleaned thoroughly from particles and dust and then the system has to be readjusted before it is started again. Contamination of the glass containers with any kind of pharmaceutically relevant particles, in particular glass particles, or pharmaceutically relevant substances has to be avoided strictly, in particular if parenterals are packaged.

Further, scratching of the glass surfaces of the containers has to be avoided as far as possible. Scratches on the container surface may hamper an optical inspection of the filled containers, in particular for the presence of pharmaceutically relevant particles. Further, scratching can lead to glass particles or dust being disassociated from the containers. These particles and dust may contaminate the containers on the filling line.

In general, attempts to solve the above problems by applying a coating to the container surface are known in the prior art. The requirements on such coatings are rather sophisticated. They have to withstand high temperatures which occur in a sterilization treatment referred to in the art as depyrogenation. Further, the coatings have to withstand low temperature treatments such as freeze drying. Even more, the coatings have to withstand washing processes, which include increased temperatures and mechanical influences. This means that the advantageous properties which the coating provides to the exterior surface of the container have to be maintained and, in addition, contamination of the container interior with any pharmaceutically relevant particle or substance from the coating has to be avoided. The preceding sophisticated requirements have led to the development of rather complex multilayer coatings. Such multilayer coatings are typically complex and costly to apply and thus, run contrary to the need for high processing rates.

What is needed in the art is a way to produce hollow bodies that are suitable for pharmaceutical packaging and can be economically produced.

SUMMARY OF THE INVENTION

The present invention refers to a process for making a functionalized hollow body, the process comprising as process steps:
  a) providing a hollow body comprising a wall which at least partially surrounds an interior volume of the hollow body, the wall comprising a layer of glass and having a wall surface comprising a surface region;
  b) at least partially superimposing the layer of glass in the surface region with a functionalizing composition precursor on a side of the layer of glass which faces away from the interior volume, the functionalizing composition precursor comprising one or more siloxanes; and
  c) at least partially contacting the functionalizing composition precursor with a plasma, thereby obtaining the functionalized hollow body, comprising a functionalizing composition which at least partially superimposes the layer of glass in the surface region on the side of the layer of glass which faces away from the interior volume.

Further, the invention is directed toward a functionalized hollow body, obtainable by the preceding process; a hollow body and a closed hollow body, each having a functionalizing composition with one or more siloxanes and a catalyzing substance; a process for packaging a pharmaceutical composition; a closed hollow body obtainable by this process; a use of a hollow body for packaging a pharmaceutical composition; a use of an emulsion; a use of a gas; and a use of a plasma.

Exemplary embodiments disclosed herein provide a process for producing a glass container for pharmaceutical packaging which allows for an advantageous combination of a high production rate of the glass container and a high processing rate of the glass container on a filling line. Exemplary embodiments disclosed herein also provide a process for producing a glass container for pharmaceutical packaging which allows for improving a suitability of the glass container which includes a heat-sensitive component, such as a syringe with a hypodermic needle glued into its tip, for processing the glass container at a high processing rate on a filling line. The preceding suitability may refer to a reduced tendency of the glass container to be damaged or even broken while being processed on the filling line. Exemplary embodiments disclosed herein also provide one of the preceding processes, wherein the process further allows for production of a glass container which shows an improved scratch resistance, in particular at least a part of its exterior surface. Further, exemplary embodiments disclosed herein also provide one of the preceding processes, wherein the process further allows for production of a glass container which shows a reduced dry sliding friction, in particular at least a part of its exterior surface. Exemplary embodiments disclosed herein also provide one of the above processes, wherein the process further allows for production of a glass container which is suitable for an easy and reliable optical inspection after having been filled. Exemplary embodiments disclosed herein also provide one of the previously described processes, wherein the process further allows for production of a glass container which is suitable for a post-treatment, for example a sterilization treatment, which may be effected as a high-temperature-treatment—in particular a depyrogenation; or a washing process; or a low-temperature-treatment—in particular a freeze drying. Exemplary embodiments disclosed herein also provide one of the above processes, wherein the process further allows for production of a glass container which does not show an increased tendency to being contaminated in a pharmaceutically relevant manner, e.g., the container shows a reduced tendency to being contaminated. The preceding contamination refers, in particular, to the presence of pharmaceutically relevant particles or substances in the container interior. Exemplary embodiments disclosed herein also provide a process for producing a glass container for pharmaceutical packaging, wherein the process can be conducted at a temperature as close as possible to 20° C., in particular significantly below 300° C. Exemplary embodiments disclosed herein also provide a process for producing a glass container for pharmaceutical packaging, wherein the process does not require a multilayer coating on a surface, such as the exterior surface, of the glass container. In particular, no application of a primer layer is needed. Exemplary embodiments disclosed herein also provide a process for producing a glass container for pharmaceutical packaging, wherein the process does not include applying any particles to the glass container. Exemplary embodiments disclosed herein also provide a process for producing a glass container for pharmaceutical packaging, wherein the process is less complex. Exemplary embodiments disclosed herein also provide a glass container for pharmaceutical packaging which is obtainable by one of the preceding processes.

An exemplary embodiment of a process for making a functionalized hollow body comprises as process steps:
a) providing a hollow body comprising a wall which at least partially surrounds an interior volume of the hollow body, the wall comprises a layer of glass and has a wall surface comprising a surface region;
b) at least partially superimposing the layer of glass in the surface region with a functionalizing composition precursor on a side of the layer of glass which faces away from the interior volume, the functionalizing composition precursor comprising one or more siloxanes; and
c) at least partially contacting the functionalizing composition precursor with a plasma, thereby obtaining the functionalized hollow body, comprising a functionalizing composition which at least partially superimposes the layer of glass in the surface region on the side of the layer of glass which faces away from the interior volume.

In some embodiments, during the contacting with the plasma in the process step c), such as during the whole process step c), the hollow body is not heated to a temperature of 300° C. or more, such as not above 250° C., not above 200° C., not above 150° C., not above 120° C., not above 100° C., not above 80° C., not above 60° C., or not above 40° C. In some embodiments, during the contacting with the plasma in the process step c), such as during the whole process step c), the hollow body has a temperature in a range from 15 to 250° C., such as from 15 to 200° C., from 20 to 150° C., from 20 to 120° C., from 20 to 100° C., from 20 to 80° C., from 20 to less than 60° C., or from 20 to less than 40° C. In some embodiments, in the process step c), the functionalizing composition precursor is cured, thereby obtaining the functionalizing composition. In some embodiments, in the process step b) the layer of glass is not superimposed with the functionalizing composition precursor on a side which faces towards to interior volume. The functionalizing composition may functionalize the wall surface at least in the surface region, which may be a region of a surface of the layer of glass, in the process step c) by being superimposed on it, such as by being adjoined to it. In the case of adjoining, the functionalizing composition may form covalent bonds, such as Si—O bonds, to the surface region, which may be a region of a surface of the layer of glass. In some embodiments, the wall surface comprises an interior surface which faces the interior volume, and an exterior surface which faces away from the interior volume; with the exterior surface comprising the surface region. The functionalizing composition may at least partially superimpose the layer of glass on the exterior surface. In some embodiments, in the process step b) the layer of glass is not superimposed with the functionalizing composition precursor on the interior surface. In some embodiments, in the process step b) the layer of glass is superimposed with the functionalizing composition precursor across at least 10%, such as at least 20%, at least 30%, at least 40%, at least 50%, at least 60%, at least 70%, at least 80%, or at least 90%, in each case of the exterior surface, or across the full exterior surface. The wall surface may consist of the interior surface and the exterior surface. In some embodiments, the surface region is a region of a surface of the layer of glass. The surface region may be contacted with the functionalizing composition precursor in the process step b).

In some embodiments, the plasma is obtainable from a plasma precursor which comprises one selected from the group consisting of Ar, $N_2$, $O_2$, and air; or a combination of at least two thereof.

In some embodiments, prior to the process step c) the process further comprises a step of obtaining the plasma from the plasma precursor.

In some embodiments, in the process step c) the functionalizing composition precursor, or the functionalizing composition, or both in sum are contacted with the plasma for a duration in a range from 1 to 600 s, such as from 1 to 120 s or from 1 to 60 s. The contacting may be effected by streaming the plasma onto the functionalizing composition for the preceding duration. In some embodiments, the process step c) lasts for a duration in range from 1 to 600 s, such as from 1 to 120 s or from 1 to 60 s.

In some embodiments, in the process step c) the plasma meets one or more of the following criteria:
a. a plasma pressure in a range from $10^{-3}$ to 1,000 mbar, such as from $10^{-2}$ to 100 mbar or from 0.1 to 10 mbar,
b. a temperature in a range from 25 to 120° C., such as 25 to less than 60° C. or 25 to less than 40° C.,
c. a degree of ionization in a range from $10^{-6}$ to 1, such as from $10^{-5}$ to 1, from $10^{-4}$ to 1, from $10^{-3}$ to 1, or from $10^{-2}$ to 0.1.

In some embodiments, the functionalizing composition precursor is an emulsion.

In some embodiments, the functionalizing composition precursor comprises the one or more siloxanes in total at a proportion in a range from 1 to 50 wt.-%, such as from 1 to 30 wt.-%, from 2 to 10 wt.-%, or from 2.5 to 5 wt.-%, in each case based on the total weight of the functionalizing composition precursor.

In some embodiments, the functionalizing composition precursor further comprises a vehicle at a proportion in a range from 45 to 99 wt.-%, such as from 70 to 99 wt.-% or from 90 to 99 wt.-%, in each case based on the total weight of the functionalizing composition precursor. The proportion of the vehicle in the functionalizing composition precursor may be decreased after the process step b), such as prior to the process step c) or in the process step c) or both, by at least 50 wt.-%, such as at least 60 wt.-%, at least 70 wt.-%, at least 80 wt.-%, at least 90 wt.-%, at least 95 wt.-%, or at least 99 wt.-%, in each case based on the proportion of the vehicle in the functionalizing composition precursor in the process step b). In some embodiments, this decreasing comprises irradiating the functionalizing composition precursor with microwaves, or to expose the functionalizing composition precursor to a vacuum, or both. Here, a vacuum may be characterized by a pressure of less than 500 mbar, such as less than 250 mbar, less than 100 mbar, less than 50 mbar, less than 10 mbar, less than 1 mbar, or less than 0.5 mbar. During the decreasing, the hollow body may have a temperature of less than 300° C., such as not more than 250° C., not more than 200° C., not more than 150° C., not more than 120° C., not more than 100° C., not more than 80° C., not more than 60° C., or not more than 40° C. In some embodiments, during the decreasing of the proportion of the vehicle in the functionalizing composition precursor the hollow body has a temperature in a range from 15 to 250° C., such as from 15 to 200° C., from 20 to 150° C., from 20 to 120° C., from 20 to 100° C., from 20 to 80° C., from 20 to less than 60° C., or from 20 to less than 40° C.

In some embodiments, the functionalizing composition precursor further comprises a stabilizer. Here, the functionalizing composition precursor may be an emulsion and the stabilizer is suitable for stabilizing the emulsion. Therein, stabilizing the emulsion means decreasing a tendency of the emulsion to form two or more separate liquid phases. A stable emulsion does not form two or more separate liquid phases after a suitable waiting time. An unstable emulsion, however, tends to form two or more separate liquid phases over time.

In some embodiments, at least one of the one or more siloxanes, such as two or more thereof or all of the one or more siloxanes, is a polyalkylsiloxane.

In some embodiments, in the process step c) obtaining the functionalizing composition from the functionalizing composition precursor comprises a crosslinking of the one or more siloxanes; or a forming of Si—O-bonds to the wall surface in the surface region, such as to the layer of glass; or both.

In some embodiments, the crosslinking comprises an addition reaction or a hydrolyzing reaction or both.

In some embodiments, the crosslinking is conducted in presence of a catalyzing substance which is suitable for catalyzing a crosslinking of the one or more siloxanes. An exemplary catalyzing substance comprises, or is based on, Pt or a peroxide or both.

In some embodiments, in the process step b) the functionalizing composition precursor has a viscosity in a range from 100 to 1,000 mPa·s, such as from 250 to 450 mPa·s.

In some embodiments, in the process step b) the layer of glass is contacted with the functionalizing composition precursor.

In some embodiments, the superimposing in the process step b) comprises one selected from the group consisting of a spraying, a dipping, and a printing; or a combination of at least two thereof. An exemplary printing is a contact printing or a contact-less printing or both. An exemplary contact printing is a tampon printing or a screen printing or both. An exemplary contact-less printing is an inkjet printing.

In some embodiments, the process step b) or c) or both comprises adjusting a coefficient of dry sliding friction of the wall surface at least in the surface region to less than 0.3, such as less than 0.2, less than 0.15, or less than 0.1. Therein, the coefficient of dry sliding friction is determined according to the measurement method described herein.

In some embodiments, the process step b) or c) or both comprises adjusting a contact angle for wetting with water of the wall surface at least in the surface region to at least 70°, such as at least 80°, at least 90°, at least 95°, or at least 100°.

In some embodiments, prior to the process step b) the process comprises a step of at least partially decreasing a contact angle for wetting with water of the wall surface at least in the surface region by a pre-treatment. The contact angle for wetting with water may be decreased at least at a part of the exterior surface or at least at a part of the interior surface or both, such as across the full exterior surface or across the full interior surface or both. In some embodiments, the contact angle for wetting with water is decreased across the full wall surface by the pre-treatment. Further, the contact angle for wetting with water of the at least part of the wall surface may be decreased to less than 30°, such as less than 20° or less than 10°.

In some embodiments, the pre-treatment is selected from the group consisting of a plasma pre-treatment, a flame pre-treatment, a corona pre-treatment, and a wet chemical pre-treatment; or a combination of at least two thereof. An exemplary plasma pre-treatment comprises contacting the surface of glass with a pre-treatment plasma obtained from an O-comprising pre-treatment plasma precursor, or from a corona discharge, or both. In case of a plasma pre-treatment, this is to be distinguished from the contacting with the plasma in the process step c), the latter not being referred to herein as pre-treatment.

In some embodiments, in the process step a) the hollow body has a first transmission coefficient for a transmission of light of a wavelength in a range from 400 nm to 2300 nm, such as from 400 to 500 nm or from 430 to 490 nm, through the hollow body via the surface region, wherein after the process step c) the hollow body has a further transmission coefficient for a transmission of light of a wavelength in a range from 400 nm to 2300 nm, such as from 400 to 500 nm or from 430 to 490 nm, through the hollow body via the surface region, a ratio of the first transmission coefficient to the further transmission coefficient being in a range from 0.95 to 1.05, such as from 0.99 to 1.01 or from 0.995 to 1.005. In some embodiments, the first and the further transmission coefficients hold for light of each wavelength in the range from 400 nm to 2300 nm, such as from 400 to 500 nm or from 430 to 490 nm.

In some embodiments, in the process step a) the hollow body has a first haze for a transmission of light through the hollow body via the surface region, and after the process step c) the hollow body has a further haze for a transmission of light through the hollow body via the surface region, the further haze being in a range from 95.0 to 105.0%, such as from 99.7 to 100.3%, from 99.8 to 100.2%, from 99.9 to 100.1%, or from 100 to less than 100.1%, in each case of the first haze. In some embodiments, the above haze values refer to a hollow body having an interior volume of about 2 ml and to a transmission of the light through a part of the hollow body which is of the shape of a hollow cylinder.

In some embodiments, the process further comprises a process step d) of heating the wall surface at least partially to at least 200° C., such as at least 250° C., at least 300° C., or at least 320° C. The preceding temperature may be kept constant for a duration of at least 3 min, such as at least 5 min, at least 10 min, at least 30 min, or at least 1 h. The preceding duration may be up to several days, 48 h, or 24 h. In some embodiments, the interior surface or the exterior surface or both, such as the full wall surface, is heated in the process step d) as outlined in the preceding. The heating in the process step d) may be a measure of a depyrogenation step.

In some embodiments, the interior volume is in a range from 0.5 to 100 ml, such as from 1 to 100 ml, from 1 to 50 ml, from 1 to 10 ml, or from 2 to 10 ml.

In some embodiments, the hollow body is a container.

In some embodiments, the container is a packaging container for a medical or a pharmaceutical packaging good or both. The container may be a primary packaging container for a medical or a pharmaceutical packaging good or both. An exemplary pharmaceutical packaging good is a pharmaceutical composition. The container may be suitable for packaging parenterals in accordance with section 3.2.1 of the European Pharmacopoeia, 7th edition from 2011.

In some embodiments, the container is one selected from the group consisting of a vial, a syringe, a cartridge, and an ampoule; or a combination of at least two thereof.

In some embodiments, the wall comprises from top to bottom of the hollow body: a top region; a body region, which follows the top region via a shoulder; and a bottom region, which follows the body region via a heel. The body region may be a lateral region of the hollow body. In some embodiments, the body region of the wall forms a hollow cylinder. Additionally or alternatively, the top region of the wall may comprise from top to bottom of the wall a flange and a neck. In some embodiments, the surface region of the wall surface lies in one selected from the group consisting of the shoulder, the body region, and the heel, or in a combination of at least two of these. In some embodiments, in the process step b) the layer of glass is at least partially superimposed in the surface region as a first surface region and, additionally, in a further surface region with the functionalizing composition precursor on a side of the layer of glass which faces away from the interior volume, wherein in the functionalized hollow body the functionalizing composition at least partially superimposes the layer of glass in the first and the further surface region on a side of the layer of glass which faces away from the interior volume. Herein, the first and the further surface regions may lie in one selected from the group consisting of the shoulder, the body region, and the heel, or in a combination of at least two of these. Therein, the first and the further surface regions may lie in the same or different of the preceding regions.

In some embodiments, throughout the body region a thickness of the layer of glass is in a range from ±0.3 mm, such as ±0.2 mm, ±0.1 mm, or ±0.08 mm, in each case based on a mean value of this thickness in the body region of the wall.

In some embodiments, throughout the body region a thickness of the layer of glass is in a range from 0.5 to 2 mm, such as from 0.6 to 1.7 mm or from 0.9 to 1.6 mm. In some embodiments, throughout the body region a thickness of the layer of glass is in a range from 0.9 to 1.1 mm or from 1.5 to 1.7 mm.

In some embodiments, the glass is of a type selected from the group consisting of a type I glass, a borosilicate glass, an aluminosilicate glass, and fused silica; or of a combination of at least two thereof.

In some embodiments, a thickness of the functionalizing composition is in a range from 50 to 750 nm, such as from 150 to 350 nm.

In some embodiments, after the process step c) the hollow body has a transmission coefficient for a transmission of light of a wavelength in a range from 400 nm to 2300 nm, such as from 400 to 500 nm or from 430 to 490 nm, through the hollow body via the surface region, of more than 0.7, such as more than 0.75, more than 0.8, or more than 0.82.

In some embodiments, after the process step c) the hollow body has a haze for a transmission of light through the hollow body via the surface region in a range from 5 to 50%, such as from 10 to 40%, from 10 to 35%, from 15 to 25%, or from 15 to 22%.

In some embodiments, towards the interior volume the layer of glass is at least partially superimposed by an alkali metal barrier layer or by a hydrophobic layer or both.

A functionalized hollow body obtainable by the previously described process is also provided. In some embodiments, a hollow body is provided comprising a wall which at least partially surrounds an interior volume of the hollow body; the wall comprises a layer of glass, and has a wall surface comprising a surface region; at least in the surface region the layer of glass is superimposed by a functionalizing composition on a side of the layer of glass which is facing away from the interior volume; the functionalizing composition comprises one or more siloxanes, and a catalyzing substance which is suitable for catalyzing a crosslinking of the one or more siloxanes.

In some embodiments, the layer of glass is not superimposed with the functionalizing composition on a side of the layer of glass which faces towards to interior volume. The functionalizing composition may adjoin the wall surface at least in the surface region. In some embodiments, the surface region is a region of a surface of the layer of glass. The functionalizing composition may functionalize the wall surface at least in the surface region, which may be a region of a surface of the layer of glass, by being superimposed on it, such as by being adjoined to it. In the case of adjoining, the functionalizing composition may form covalent bonds, such as Si—O bonds, to the surface region, which may be a region of a surface of the layer of glass.

In some embodiments, the wall surface comprises an interior surface which faces the interior volume, and an exterior surface which faces away from the interior volume; the exterior surface comprising the surface region. In some embodiments, the functionalizing composition at least partially superimposes the layer of glass on the exterior surface. In some embodiments, the layer of glass is not superimposed with the functionalizing composition precursor on the interior surface. The layer of glass may be superimposed with the functionalizing composition precursor across at least 10%, such as at least 20%, at least 30%, at least 40%, at least 50%, at least 60%, at least 70%, at least 80%, or at least 90%, in each case of the exterior surface, or across the full exterior surface. The wall surface may consist of the interior surface and the exterior surface.

In some embodiments, the functionalizing composition adjoins the layer of glass. The functionalizing composition may form covalent bonds, such as Si—O bonds, to the layer of glass.

In some embodiments, the functionalizing composition comprises the catalyzing substance at a proportion in a range from more than 0 up to less than 1 wt.-%, such as from more than 0 up to less than 0.5 wt.-% or from more than 0 up to less than 0.1 wt.-%, in each case based on the functionalizing composition.

In some embodiments, the catalyzing substance comprises, or is based on, Pt or a peroxide or both.

In some embodiments, the one or more siloxanes are at least partially crosslinked.

In some embodiments, the functionalizing composition comprises the one or more siloxanes in total at a proportion of at least 50 wt.-%, such as at least 60 wt.-%, at least 70 wt.-%, at least 80 wt.-%, at least 90 wt.-%, at least 95 wt.-%, or at least 99 wt.-%, in each case based on the functionalizing composition. Typically, the functionalizing composition comprises the one or more siloxanes in total at a proportion of less than 100 wt.-%.

In some embodiments, at least one of the one or more siloxanes is a polyalkylsiloxane.

In some embodiments, the least one of the one or more siloxanes are at least partially bonded to the layer of glass via covalent Si—O-bonds.

In some embodiments, at least in the surface region a coefficient of dry sliding friction of the wall surface is less than 0.3, such as less than 0.2, less than 0.15, or less than 0.1. The coefficient of dry sliding friction is determined according to the measurement method described herein.

In some embodiments, at least in the surface region a contact angle for wetting with water of the wall surface is at least 70°, such as at least 80°, at least 90°, at least 95°, or at least 100°.

In some embodiments, the hollow body has a first transmission coefficient for a transmission of light of a wavelength in a range from 400 nm to 2300 nm, such as from 400 to 500 nm or from 430 to 490 nm, through the hollow body not via any region of the wall surface which is superimposed by the functionalizing composition, wherein the hollow body has a further transmission coefficient for a transmission of light of a wavelength in a range from 400 nm to 2300 nm, such as from 400 to 500 nm or from 430 to 490 nm, through the hollow body via the surface region, a ratio of the first transmission coefficient to the further transmission coefficient being in a range from 0.95 to 1.05, such as from 0.99 to 1.01 or from 0.995 to 1.005. In some embodiments, the first and the further transmission coefficients hold for light of each wavelength in the range from 400 nm to 2300 nm, such as from 400 to 500 nm or from 430 to 490 nm.

In some embodiments, the hollow body has a first haze for a transmission of light through the hollow body not via any region of the wall surface which is superimposed by the functionalizing composition, the hollow body having a further haze for a transmission of light through the hollow body via the surface region, the further haze being in a range from 95.0 to 105.0%, such as from 99.7 to 100.3%, from 99.8 to 100.2%, from 99.9 to 100.1%, or from 100 to less than 100.1%, in each case of the first haze. In some embodiments, the above haze values refer to a hollow body having an interior volume of about 2 ml and to a transmission of the light through a part of the hollow body which is of the shape of a hollow cylinder.

In some embodiments, the hollow body has a transmission coefficient for a transmission of light of a wavelength in a range from 400 nm to 2300 nm, such as from 400 to 500 nm or from 430 to 490 nm, through the hollow body via the surface region, of more than 0.7, such as more than 0.75, more than 0.8, or more than 0.82.

In some embodiments, the hollow body has a haze for a transmission of light through the hollow body via the surface region in a range from 5 to 50%, such as from 10 to 40%, from 10 to 35%, from 15 to 25%, or from 15 to 22%.

In some embodiments, the interior volume is in a range from 0.5 to 100 ml, such as from 1 to 100 ml, from 1 to 50 ml, from 1 to 10 ml, or from 2 to 10 ml.

In some embodiments, the hollow body is a container.

In some embodiments, the container is a packaging container for a medical or a pharmaceutical packaging good or both. The container may be a primary packaging container for a medical or a pharmaceutical packaging good or both. An exemplary pharmaceutical packaging good is a pharmaceutical composition. The container may be suitable for packaging parenterals in accordance with section 3.2.1 of the European Pharmacopoeia, 7th edition from 2011.

In some embodiments, the container is one selected from the group consisting of a vial, a syringe, a cartridge, and an ampoule; or a combination of at least two thereof.

In some embodiments, the wall comprises from top to bottom of the hollow body a top region; a body region, which follows the top region via a shoulder; and a bottom region, which follows the body region via a heel. The body region may be a lateral region of the hollow body. In some embodiments, the body region of the wall forms a hollow cylinder. Additionally or alternatively to the preceding, the top region of the wall comprises from top to bottom of the wall a flange and a neck. The surface region of the wall surface may lie in one selected from the group consisting of the shoulder, the body region, and the heel, or in a combination of at least two of these. In some embodiments, the layer of glass is at least partially superimposed in the surface region as a first surface region and, additionally, in a further surface region with the functionalizing composition on a side of the layer of glass which faces away from the interior volume. The first and the further surface regions may lie in one selected from the group consisting of the shoulder, the body region, and the heel, or in a combination of at least two of these. Therein, the first and the further surface regions may lie in the same or different of the preceding regions.

In some embodiments, throughout the body region a thickness of the layer of glass is in a range from ±0.3 mm, such as ±0.2 mm, ±0.1 mm, or ±0.08 mm, in each case based on a mean value of this thickness in the body region of the wall.

In some embodiments, throughout the body region a thickness of the layer of glass is in a range from 0.5 to 2 mm, such as from 0.6 to 1.7 mm or from 0.9 to 1.6 mm. Throughout the body region a thickness of the layer of glass may be in a range from 0.9 to 1.1 mm or in a range from 1.5 to 1.7 mm.

In some embodiments, the glass is of a type selected from the group consisting of a type I glass, a borosilicate glass, an aluminosilicate glass, and fused silica; or of a combination of at least two thereof.

In some embodiments, a thickness of the functionalizing composition is in a range from 50 to 750 nm, such as from 150 to 350 nm.

In some embodiments, towards the interior volume the layer of glass is at least partially superimposed by an alkali metal barrier layer or by a hydrophobic layer or both.

In some embodiments, the interior volume comprises a pharmaceutical composition.

In some embodiments, a closed hollow body is provided that comprises a wall which at least partially surrounds an interior volume which comprises a pharmaceutical composition; the wall comprising a layer of glass, and having a wall surface comprising a surface region; at least in the surface region the layer of glass is superimposed by a functionalizing composition on a side of the layer of glass which is facing away from the interior volume; the functionalizing composition comprising one or more siloxanes, and a catalyzing substance which is suitable for catalyzing a cross-linking of the one or more siloxanes.

In some embodiments, the closed hollow body shows the technical features of the previously described hollow body.

In some embodiments, a process is provided that comprises as process steps:

A) providing the previously described functionalized hollow body or hollow body;

B) inserting a pharmaceutical composition into the interior volume; and

C) closing the hollow body.

The closing in the process step C) may comprise contacting the functionalized hollow body or the hollow body with a closure, such as a lid, covering an opening of the functionalized hollow body or the hollow body with the closure, and joining the closure to the functionalized hollow body or the hollow body. The joining may comprise creating a form-fit of the functionalized hollow body or the hollow body, such as of the flange of the functionalized hollow body or the hollow body, with the closure. The form-fit may be created via a crimping step. The process may be a process for packaging the pharmaceutical composition.

In some embodiments, prior to the process step B) the process further comprises a step of heating the wall surface at least partially to at least 200° C., such as at least 250° C., at least 300° C., or at least 320° C. The preceding temperature may be kept constant for a duration of at least 3 min, such as at least 5 min, at least 10 min, at least 30 min, or at least 1 h. The preceding duration may be up to several days, 48 h, or 24 h. In some embodiments, the interior surface or the exterior surface or both, such as the full wall surface, is heated in the process step d) as previously described. The heating in the process step d) may be a measure of a depyrogenation step.

In some embodiments, a closed hollow body is obtainable by the previously described process.

In some embodiments, a process is provided that comprises as process steps

A. providing the previously described hollow body or the closed hollow body; and B. administering the pharmaceutical composition to a patient.

In some embodiments, a use of the previously described functionalized hollow body, or of the hollow body, is provided for packaging a pharmaceutical composition. The packaging may comprise inserting the pharmaceutical composition into the interior volume and closing the hollow body.

In some embodiments, a use of an emulsion, comprising a siloxane, such as two or more siloxanes, is provided for functionalizing at least a part of an exterior surface of a wall of a container, the wall comprising a layer of glass. An exemplary container is a pharmaceutical packaging container, such as one selected from the group consisting of a vial, a syringe, a cartridge, and an ampoule; or a combination of at least two thereof. In some embodiments, the emulsion is used for functionalizing at least a part of the exterior surface, wherein the at least part is a surface of the layer of glass. The exterior surface may be a surface of the layer of glass.

In some embodiments, the functionalizing comprises at least partially superimposing the layer of glass on the exterior surface with the emulsion, and at least partially contacting the emulsion, or a composition obtained from the emulsion, or both with a plasma.

In some embodiments, a use of a gas for creating a plasma is provided for at least partially contacting a functionalizing composition precursor comprising a siloxane, such as two or more siloxanes, the functionalizing composition precursor being superimposed on an exterior surface of a wall of a container, the wall comprising a layer of glass. An exemplary container is a pharmaceutical packaging container, such as one selected from the group consisting of a vial, a syringe, a cartridge, and an ampoule; or a combination of at least two thereof. In some embodiments, the functionalizing composition precursor adjoins at least a part of the exterior surface which is a surface of the layer of glass. The exterior surface may be a surface of the layer of glass.

In some embodiments, the gas comprises one selected from the group consisting of Ar, $N_2$, $O_2$, and air; or a combination of at least two thereof.

In some embodiments, a use of a plasma is provided for at least partially contacting a functionalizing composition precursor comprising a siloxane, such as two or more siloxanes, the functionalizing composition precursor being superimposed on an exterior surface of a wall of a container, the wall comprising a layer of glass. An exemplary container is a pharmaceutical packaging container, such as one selected from the group consisting of a vial, a syringe, a cartridge, and an ampoule; or a combination of at least two thereof. In some embodiments, the functionalizing composition precursor adjoins at least a part of the exterior surface which is a surface of the layer of glass. The exterior surface may be a surface of the layer of glass.

In some embodiments, the plasma meets one or more of the following criteria:

a. a plasma pressure in a range from $10^{-3}$ to 1,000 mbar, such as from $10^{-2}$ to 100 mbar or from 0.1 to 10 mbar b. a temperature in a range from 25 to 120° C., such as 25 to less than 60° C. or 25 to less than 40° C., c. a degree of ionization in a range from $10^{-6}$ to 1, such as from $10^{-5}$ to 1, from 10-4 to 1, from $10^{-3}$ to 1, or from $10^{-2}$ to 0.1.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Hollow Body

Figure 1:
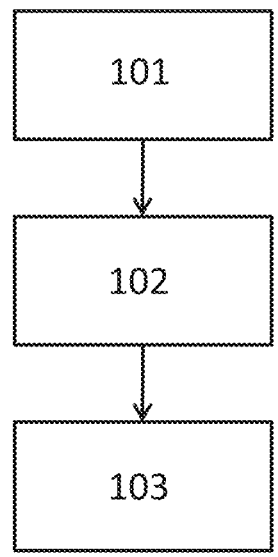
FIG. 1 shows a flow chart of a process according to the invention for making a functionalized hollow body.

The hollow body provided according to the invention may have any size or shape appropriate in the context of the invention. In some embodiments, the head region of the hollow body comprises an opening, which allows for inserting a pharmaceutical composition into the interior volume of the hollow body. In that case, the wall surrounds the interior volume of the hollow body only partially. The hollow body may be a glass body or a glass container in that sense that the layer of glass extends over the full area of the wall surface. In that case, the layer of glass can determine a macroscopic shape of the wall. In some embodiments, the layer of glass is of a one-piece design. The layer of glass of such a glass body or a glass container may be made by blow molding a glass melt; or by preparing a tube of a glass, such as in the form of a hollow cylinder, forming the bottom of the hollow body from one end of the tube, thereby closing the tube at this end, and forming the head region of the hollow body from the opposite end of the tube. According to the nomenclature used herein, the wall of the hollow body comprises the layer of glass and every layer and every functionalization superimposed thereon. The wall sur-face is formed by the surface of the layer or functionalization which is positioned at an outer-most or innermost position of the wall.

As used herein, the interior volume represents the full volume of the interior of the hollow body. This volume may be determined by filling the interior of the hollow body with water up to the brim and measuring the volume of the amount of water which the interior can take up to the brim. Hence, the interior volume as used herein is not a nominal volume as it is often referred to in the technical field of pharmacy. This nominal volume may for example be less than the interior volume by a factor of about 0.5.

Glass

The glass of the layer of glass may be any type of glass and may consist of any material or combination of materials suitable in the context of the invention. In some embodiments, the glass is suitable for pharmaceutical packaging. The glass may be of type I in accordance with the definitions of glass types in section 3.2.1 of the European Pharmacopoeia, 7th edition from 2011. Additionally or alternatively, the glass is selected from the group consisting of a borosilicate glass, an aluminosilicate glass, and fused silica; or a combination of at least two thereof. As used herein, an aluminosilicate glass is a glass which has a content of $Al_2O_3$ of more than 8 wt.-%, such as more than 9 wt.-% and/or in a range from 9 to 20 wt.-%, in each case based on the total weight of the glass. An exemplary aluminosilicate glass has a content of $B_2O_3$ of less than 8 wt.-%, such as at maximum 7 wt.-% and/or in a range from 0 to 7 wt.-%, in each case based on the total weight of the glass. As used herein, a borosilicate glass is a glass which has a content of $B_2O_3$ of at least 1 wt.-%, such as at least 2 wt.-%, at least 3 wt.-%, at least 4 wt.-%, at least 5 wt.-%, and/or in a range from 5 to 15 wt.-%, in each case based on the total weight of the glass. An exemplary borosilicate glass has a content of $Al_2O_3$ of less than 7.5 wt.-%, such as less than 6.5 wt.-% and/or in a range from 0 to 5.5 wt.-%, in each case based on the total weight of the glass. In a further aspect, the borosilicate glass may have a content of $Al_2O_3$ in a range from 3 to 7.5 wt.-%, such as in a range from 4 to 6 wt.-%, in each case based on the total weight of the glass.

In some embodiments, the glass is essentially free from B. Therein, the wording "essentially free from B" refers to glasses which are free from B which has been added to the glass composition by purpose. This means that B may still be present as an impurity, but at a proportion of not more than 0.1 wt.-%, such as not more than 0.05 wt.-%, in each case based on the weight of the glass.

Functionalizing Composition Precursor

The functionalizing composition precursor is a precursor of the functionalizing composition according to the invention. Obtaining the functionalizing composition from the functionalizing composition precursor comprises contacting the functionalizing composition precursor with a plasma. In some embodiments, obtaining the functionalizing composition from the functionalizing composition precursor further comprises crosslinking the one or more siloxanes of the functionalizing composition precursor. This crosslinking may comprise an addition reaction or a hydrolyzing reaction or both. In some embodiments, the functionalizing composition precursor is liquid, such as an emulsion. In some embodiments, the functionalizing composition precursor comprises 2 or 3 different types of siloxanes.

Plasma and Plasma Precursor

The plasma may be any appropriate plasma. Further, any plasma precursor from which the pre-ceding plasma may be obtained may be applied as the plasma precursor in the context of the invention. The plasma precursor may be a gas. An exemplary plasma precursor comprises one selected from the group consisting of Ar, $N_2$, $O_2$, and air; or a combination of at least two thereof. Therein, a proportion of the Ar in the plasma precursor may be in a range from 50 to 100 vol.-%, such as 50 to less than 100 vol.-%, 50 to 95 vol.-%, 50 to 90 vol.-%, or 50 to 85 vol.-%; or a proportion of the $O_2$ in the plasma precursor may be in a range from more than 0 to 50 vol.-%, such as from more than 0 to 50 vol.-%, from 5 to 50 vol.-%, from more than 10 to 50 vol.-%, from more than 15 to 50 vol.-%; or both, in each case based on the total volume of the plasma precursor. An exemplary plasma precursor consists of $0_2$ and Ar. Obtaining the plasma from the plasma precursor may be effected in any manner suitable for creating a plasma. The obtaining may comprise irradiating the plasma precursor with electromagnetic waves, or passing an electric current through the plasma precursor, or both. Exemplary electromagnetic waves are one selected from the group consisting of electromagnetic waves with frequencies in the microwave range, electromagnetic waves at radio frequencies, electromagnetic waves at audio frequencies, and electromagnetic waves at low frequencies, or a combination of at least two thereof. An exemplary electromagnetic current is a DC current. An exemplary DC current is driven by one selected from the group consisting of a glow discharge, a corona discharge, and an electric arc, or by a combination of at least two thereof. The plasma precursor or the plasma or both may be characterized by an ionization energy in a range from 10 to 15 eV, such as from 11 to 14 eV or from 12 to 14 eV. In some embodiments, the plasma precursor or the plasma or both has an ionization energy at one selected from the group consisting of 12.1 eV, 13.6 eV, 15.6 eV, 14.5 eV, and 15.7 eV, or a combination of at least two thereof. The ionization energy at 12.1 eV can correspond to an ionization energy for obtaining $O_2^+$ from $O_2$, the ionization energy at 13.6 eV to for obtaining O+ from O, the ionization energy at 15.6 eV to for obtaining $N_2^+$ from $N_2$, the ionization energy at 14.5 eV to for obtaining N⁺ from N, the ionization energy at 15.7 eV to for obtaining Ar⁺ from Ar.

Emulsion

The functionalizing composition precursor may be an emulsion. As used herein, an emulsion is a mixture of at least two liquid phases. Therein, the at least two liquid phases as such are typically immiscible. In an emulsion, typically at least one liquid phase (referred to as dispersed phase) is dispersed in another liquid phase (referred to as continuous phase). The continuous phase may be the vehicle.

Vehicle

Any vehicle appropriate for being used in the context of the invention comes into consideration. Here, the vehicle is a, for example liquid, medium which allows for the at least partially superposition of the functionalizing composition precursor onto the surface region in a convenient, such as uniform, manner. When the functionalizing composition precursor is an emulsion, the vehicle may be a continuous phase of the emulsion. In general, the vehicle may be organic or inorganic or both. An exemplary vehicle is inorganic. An exemplary inorganic vehicle is water.

Stabilizer

Any stabilizer appropriate to be applied for purposes of the invention comes into consideration. An exemplary stabilizer is designed for stabilizing the functionalizing composition precursor, in particular in case of a functionalizing composition precursor which is an emulsion. Stabilizing the emulsion means decreasing a tendency of the emulsion two form two or more separate liquid phases. A stable emulsion does not form two or more separate liquid phases after a suitable waiting time. An unstable emulsion, however, tends to form two or more separate liquid phases over time.

An exemplary stabilizer is one or more organic compounds. Exemplary organic compounds are polar or non-polar or a combination thereof. Exemplary non-polar compounds are selected from the group consisting of a linear hydrocarbon, a branched hydrocarbon, a cyclic hydrocarbon and an aromatic hydrocarbon or a combination of two or more thereof. Exemplary hydrocarbons are terpenes, paraffines, benzene, toluene, xylene, cyclo pentane, cyclo hexane, cyclo heptane, $C_4$- to $C_{12}$-hydrocarbons or a combination of at least two thereof.

Exemplary polar compounds are aprotic or protic. Exemplary aprotic polar compounds are selected form the group consisting of an ester, an ether, a lactame and a ketone or a combination of at least two thereof. Amongst these, butylacetate, methoxybutylacetate, butyldiglycole, butyldiglycolacetate, methoxypropylacetate or a combination of at least two thereof are exemplary esters; dipropyleneglycolemonomethylether, dipropylenglycolemonobutylether, propyleneglycolemonobutylether, propyleneglycolmonopropylether, propyleneglycolmonoethylether or a combination of at least two thereof are exemplary ethers; ethylpyrrolidone, methylpyrrolidone or a combination of two thereof are exemplary lactames; and cyclohexanon is an exemplary ketone.

Exemplary protic polar compounds are alcohols. Amongst these butylglycol, diacetonalcohol, diethylenglycol, $C_2$ to $C_8$-alcohol, monoethylenglycol, propylenglycol or a combination of at least two thereof are exemplary.

Siloxanes

In some embodiments, at least one of the one or more siloxanes in the functionalizing composition precursor, such as two or more thereof or all of the one or more siloxanes, is a polyorganosiloxane, such as a polyalkylsiloxane. An exemplary polyalkylsiloxane is a polymethylsiloxane. An exemplary polymethylsiloxane is a polydimethylsiloxane. In some embodiments, at least one, such as at least two or all, of the one or more siloxanes comprises a functional group which is suitable for crosslinking the one or more siloxanes. Here, the one or more siloxanes may comprise same or different functional groups. Further, an exemplary siloxane comprises a functional group selected from the group consisting of a vinyl group; an alkoxy group; an amino group; an epoxy group; a hydride group; a hydroxyl group, such as a carbinol group; an acrylate group, such as a methacrylate group; and a group containing F; or a combination of at least two thereof. Accordingly, the one or more siloxanes comprise one selected from the group contusing of a vinyl functional siloxane, such as a vinyl functional fluorosiloxane; an amino functional siloxane; a hydroxyl functional siloxane, such as a carbinol functional siloxane; an acrylate functional siloxane, such as a methacrylate functional siloxane; and a hydride functional siloxane; or a combination of at least two thereof. An exemplary vinyl functional siloxane is described by one of the following structural formulas:

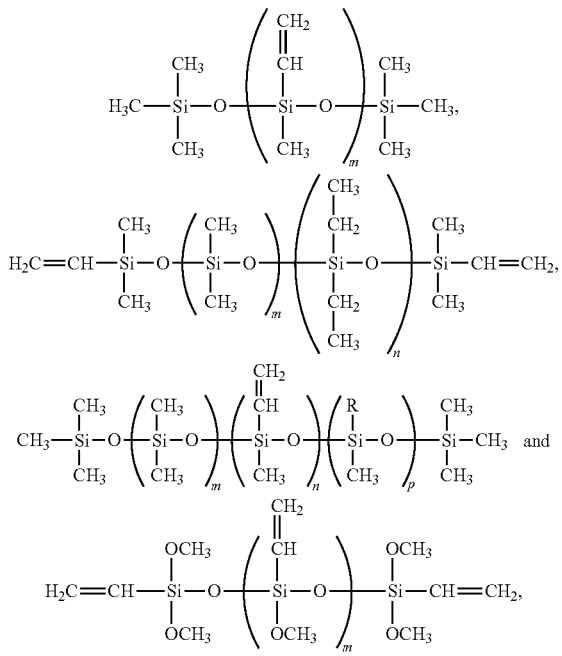

wherein m, n and p are integers which are independently form each other in a range from 2 to 10,000, such as from 3 to 5,000 or from 4 to 2,500. An exemplary vinyl functional fluorosiloxane is described by the following structural formula:

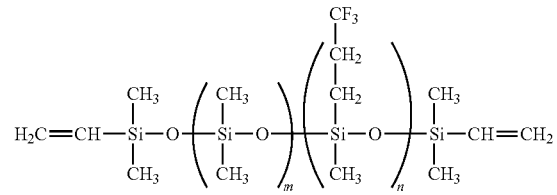

wherein m and n are integers which are independently form each other in a range from 2 to 10,000, such as from 3 to 5,000 or from 4 to 2,500. An exemplary amino functional siloxane is described by one of the following structural formulas:

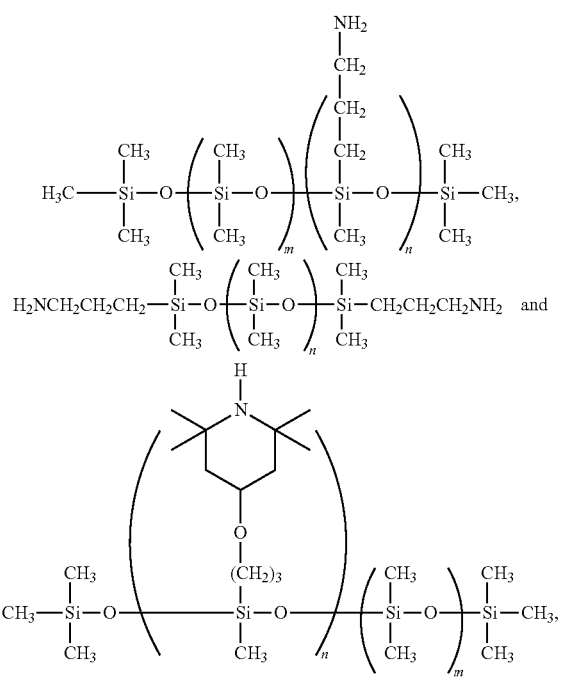

wherein m and n are integers which are independently form each other in a range from 2 to 10,000, such as from 3 to 5,000 or from 4 to 2,500. An exemplary hydroxyl functional siloxane is described by one of the following structural formulas:

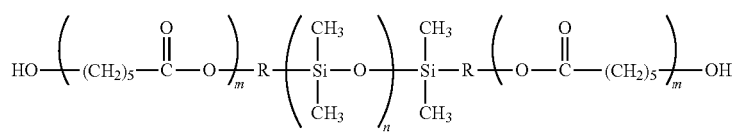

wherein m and n are integers which are independently form each other in a range from 2 to 10,000, such as from 3 to 5,000 or from 4 to 2,500. An exemplary methacrylate functional siloxane is described by one of the following structural formulas:

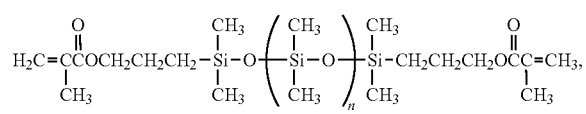

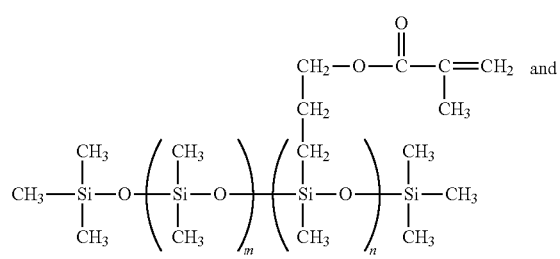

-continued

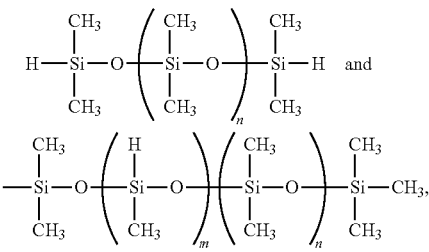

wherein m and n are integers which are independently form each other in a range from 2 to 10,000, such as from 3 to 5,000 or from 4 to 2,500. An exemplary hydride functional siloxane is described by one of the following structural formulas:

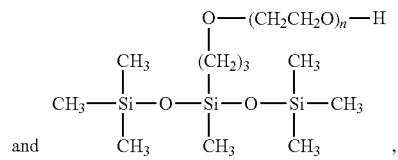

wherein m and n are integers which are independently form each other in a range from 2 to 10,000, such as from 3 to 5,000 or from 4 to 2,500.

Depyrogenation

In some embodiments, the heating in the process step d) or the heating in the process step B) or both is a measure of a depyrogenation step. In the technical field of pharamacy, depyrogenation is a step of decreasing an amount of pyrogenic germs on a surface, such as via a heat-treatment. Therein, the amount of pyrogenic germs on the surface may be decreased as much as possible, such as by at least 80%, at least 90%, at least 95%, at least 99%, at least 99.5%, or by 100%, in each case based on an amount of the pyrogenic germs on the surface prior to the depyrogenation.

Pharmaceutical Composition

In the context of the invention, every suitable pharmaceutical composition comes into consideration. A pharmaceutical composition is a composition comprising at least one active ingredient. An exemplary active ingredient is a vaccine. The pharmaceutical composition may be fluid or solid or both. An exemplary solid composition is granular such as a powder, a multitude of tablets or a multitude of capsules. A further exemplary pharmaceutical composition is a parenteral, i.e. a composition which is intended to be administered via the parenteral route, which may be any route which is not enteral. Parenteral administration can be performed by injection, e.g. using a needle (usually a hypodermic needle) and a syringe, or by the insertion of an indwelling catheter.

Wall

Herein, the wall of the hollow body comprises a layer of glass. The wall may comprise further layers on one or both sides of the layer of glass. The layer of glass may extend laterally throughout the wall. This means that each point on the wall surface lies on top of a point of the layer of glass. The hollow body may be a hollow body of glass. In any case, the layers of the wall are joined to one another. Two layers are joined to one another when their adhesion to one another goes beyond van der Waals attraction forces. Unless otherwise indicated, the layers in a layer sequence may follow one another indirectly, in other words with one or at least two intermediate layers, or directly, in other words without an intermediate layer. This is particularly the case with the formulation wherein one layer superimposes another layer. Further, if an entity (e.g. composition precursor, particles) is superimposed onto a layer or a surface, this entity may be contacted with that layer or surface or it may not be contacted with that layer or surface, but be indirectly overlaid onto that layer or surface with another entity (e.g. a layer) in-between.

Alkali Metal Barrier Layer and Hydrophobic Layer

In some embodiments, the layer of glass of the hollow body is superimposed by an alkali metal barrier layer or by a hydrophobic layer or both, in each case towards the interior volume of the hollow body. The alkali metal barrier layer or by the hydrophobic layer or both may form at least a part of the interior surface, such as the full interior surface. The alkali metal barrier layer may consist of any material or any combination of materials which are suitable for providing a barrier action against migration of an alkali metal ion, such as against any alkali metal ion. The alkali metal barrier layer may be of a multilayer structure. In some embodiments, the alkali met-al barrier layer comprises $SiO_2$, such as a layer of $SiO_2$. Further, the hydrophobic layer may consist of any material or any combination of materials which provides a layer surface towards the interior volume which has a contact angle for wetting with water of more than 90°. The hydrophobic layer may allow for the formation of a well-defined cake upon freeze-drying, in particular in terms of a shape of the cake. An exemplary hydrophobic layer comprises a com-pound of the general formula $SiO_xC_yH_z$, such as a layer of this compound. Therein, x is a number which is less than 1, such as in a range from 0.6 to 0.9 or from 0.7 to 0.8; y is a number in a range from 1.2 to 3.3, such as from 1.5 to 2.5; and z is a number as well.

Catalyzing Substance

Any material which is appropriate for catalyzing a cross-linking of the one or more siloxanes of the functionalizing composition precursor or the functionalizing composition comes may be applied for the purpose of the invention. Therein, the crosslinking may comprise an addition reaction or a hydrolyzing reaction or both. Exemplary catalyzing substances are Pt and perox-ides.

Measurement Methods

The following measurement methods are to be used in the context of the invention. Unless otherwise specified, the measurements have to be carried out at an ambient temperature of 23° C., an ambient air pressure of 100 kPa (0.986 atm) and a relative atmospheric humidity of 50%.

Contact Angle for Wetting with Water

The contact angle of a surface for wetting with water is determined in accordance with the standard DIN 55660, parts 1 and 2. The contact angle is determined using the static method. Deviating from the standard, the measurement is conducted at curved surfaces as the wall of the hollow body is usually curved. Further, the measurements are conducted at 22 to 25° C. ambient temperature and 20 to 35% relative atmospheric humidity. A Drop Shape Analyzer —DSA30S from Krüss GmbH is applied for the measurements. Uncertainty of the measurement increases for contact angles below 10°.

Wall Thickness and Tolerance of Wall Thickness

The wall thickness and deviations from the mean value of the wall thickness (tolerance) are determined in accordance with the following standards for the respective type of hollow body:

DIN ISO 8362-1 for vials,
DIN ISO 9187-1 for ampoules,
DIN ISO 110 4 0-4 for syringes,
DIN ISO 13926-1 for cylindrical cartridges, and
DIN ISO 11040-1 for dental cartridges.

Transmission Coefficient

Herein, the transmission coefficients are defined as $T=I_{trans}/I_0$, wherein $I_0$ is the intensity of the light which is incident at a right angle on an incidence region of the surface region and $I_{trans}$ is the intensity of the light which leaves the hollow body on a side of the hollow body which is opposite to the incidence region. Hence, T refers to light which transmits the empty hollow body completely, i.e. one time through the wall into the empty interior volume and from there a second time through the wall out of the interior volume. Hence, the light transmits through two curved sections of the wall of the hollow body. The transmission coefficient is determined in accordance with the standard ISO 15368:2001(E), wherein an area of measurement of the dimensions 3 mm×4 mm is used. Further, the light is incident on the hollow body at a right angle to the vertical extension of the exterior surface of the hollow body. In some embodiments, the transmission coefficients herein refer to a hollow body of the type 2R according to DIN/ISO 8362 and to a transmission of the light through a part of the hollow body which is of the shape of a hollow cylinder.

Haze

The haze is a measure for the opacity of a transparent sample, such as a glass sample. The value of the haze represents the fraction of light which has been transmitted through the sample, here the empty container, and which is scattered out of a certain spatial angle around the optical axis. Thus, the haze quantifies material defects in the sample which negatively affect transparency. Herein, the haze is determined according to the standard ASTM D 1033. In accordance with this standard, 4 spectra are measured and for each of them the transmission coefficient is calculated. The haze value in % is calculated from these coefficients of transmission. A Thermo Scientific Evolution 600 spectrometer with integrating sphere and the software OptLab-SPX are applied for the measurements. In order to allow for measuring the diffusive transmission, the sample is positioned in front of the entrance of the integrating sphere. The reflection opening is left empty such that only the transmitted and scattered fraction of the incident light is detected. The fraction of the transmitted light which is not sufficiently scattered is not detected. Further measurements pertain to detection of the scattered light in the sphere (without sample) and to the overall transmission of the sample (reflection opening closed). All the measurement results are normalized to the overall transmission of the sphere without sample which is implemented as obligatory baseline correction in the software. Herein, the haze refers to light which transmits the hollow body completely, i.e. one time through the wall into the interior volume and from there a second time through the wall out of the interior volume. Hence, the light transmits through two curved sections of the wall of the hollow body. Further, the light is incident on the hollow body at a right angle to the vertical extension of the exterior surface of the hollow body. The hollow body may be a vial of the type 2R according to DIN/ISO 8362 and the transmission is conducted through a part of the hollow body which is of the shape of a hollow cylinder.

Catalyzing Substance

The catalyzing substance is detected via Secondary Neutral Mass Spectrometry (SNMS). This method is particularly suitable for detecting small amounts of Pt of a catalyzing substance. For the post-ionization a VUV-laser system (Excimer-Laser LPF 220 from Coherent Inc.) is used. Accordingly, laser light at a wavelength of 157 nm, a photon energy of 7.9 eV, a maximum pulse energy of 30 mJ, a pulse length of 17 ns and a maximum power density of $1.4 \cdot 10^8$ W/cm$^2$ is used. The surface area which is tested is at least 50 up to 500 µm$^2$ large. The duration of measurement is at least 100 s, but not more than 5 min.

Viscosity

The viscosity of the functionalizing composition precursor is determined using a Brookfield Digital-Rheometer. Further, a DIN-Adapter 86 is used. The sample to be tested is positioned in a narrow gap between an inner and an outer cylinder. One of the two cylinders (DIN Adapter 86) is driven by a motor, the other remains coaxially fixed. In the narrow annular gap between the wall and the rotating body, the viscous liquid is sheared and thereby breaks the movement of the rotating body, which can be detected as a measuring signal by various means. During rotation of the rotating body, the shear stress is then measured given a defined velocity gradient (constant rotational speed). The viscosity of the liquid can then be determined from the values read and from the exact geometry of the rotating body used (DIN Adapter 86). The viscosity is determined under laminar conditions, not under turbulent conditions. For accurate measurements, the temperature is controlled. All measurements are conducted at 24° C.

Scratch Test and Coefficient of Dry Sliding Friction

An MCT MikroCombiTester (MCT S/N 01-04488) from CSM Instruments is applied for the scratch test and for measuring the coefficient of dry friction. As the friction partner, a hollow body which is identical to the hollow body to be tested, including any coatings or functionalizations, is used. Further, in the test same surfaces are scratched/slide against each other. The friction partner is hold in position by a special mount above the hollow body to be tested. Here, the friction partner and the hollow body to be tested incline an angle of 90° in a top view. For both measurements, the hollow body to be tested is moved forwards, thereby scratching over the surface of the friction partner at a well-defined force. For both tests, the hollow body to be measured is moved forwards underneath the friction partner at a velocity of 10 mm/min over a test length of 15 mm. In case of the scratch test, the test force is progressively increased from 0 to 30 N (load rate 19.99 N/min) across the test length. Afterwards, the scratched surface is checked with a microscope at a magnification of 5 times. In case of measuring the coefficient of dry sliding friction, a constant test force of 0.5 N is applied. The coefficient of dry friction is determined from the measured values, wherein only values after the initial 0.2 mm up to the full test length of 15 mm are considered, in order to minimize the influence of the static friction.

Example 1 (According to the Invention)

Preparation of Functionalizing Emulsion:

181.20 g of high purity water (water for injection) are provided in a beaker. 28.80 g of DC366 (Dimethicone NF Emulsion 35%) from Dow Corning are added to the beaker and the obtained composition is stirred for 1 h with a magnetic stirrer at ambient temperature of 20° C. The thus obtained emulsion is ready for use.

Functionalization with Emulsion:

A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. The washed vial is immersed with its bottom first into the functionalizing emulsion, which has been prepared as set out above, at a velocity of 20 cm/min. Therein, the head region of the vial, including the vial opening, is not immersed into the emulsion in order to prevent contacting the interior surface of the vial with the emulsion. The vial is kept in the composition for 1 s. Afterwards, the vial is retracted from the emulsion at a velocity of 10 cm/min. Subsequently, the vial is kept as it is for 10 s at ambient temperature of 20° C. Then the vial is placed with its bottom onto an absorbent substrate such as a paper towel. Then the functionalizing emulsion which has been applied to the vial is cured by treating the solution for 10 s with a plasma. This plasma is obtained from a gas using a low-pressure plasma system of the type Nano from Diener electronic GmbH+Co. KG, Ebhausen, Germany. The system is operated at a constant frequency of 13.56 MHz and at 150 W. The gas consists of 15 vol.-% of $O_2$ and 85 vol.-% of Ar. Further, the plasma has a temperature of 25° C. and a pressure of 5 mbar. Accordingly, the glass vial is not heated above 25° C. for the functionalization procedure. The DC366, which is used for functionalizing, comprises a catalyst which supports curing of the functionalization emulsion.

Example 2 (According to the Invention)

Preparation of Functionalizing Emulsion:

181.20 g of high purity water (water for injection) are provided in a beaker. 28.80 g of MED-361 from NuSil are added to the beaker and the obtained composition is stirred for 1 h with a magnetic stirrer at ambient temperature of 20° C. The thus obtained emulsion is ready for use.

Functionalization with Emulsion:

A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. The washed vial is immersed with its bottom first into the functionalizing emulsion, which has been prepared as set out above, at a velocity of 30 cm/min. Therein, the head region of the vial, including the vial opening, is not immersed into the emulsion in order to prevent contacting the interior surface of the vial with the emulsion. The vial is kept in the composition for 1 s. Afterwards, the vial is retracted from the emulsion at a velocity of 20 cm/min. Subsequently, the vial is kept as it is for 10 s at ambient temperature of 20° C. Then the vial is placed with its bottom onto an absorbent substrate such as a paper towel. Then the functionalizing emulsion which has been applied to the vial is cured by treating the emulsion for 20 s with a plasma. This plasma is obtained from a gas using the low-pressure plasma system of the type Nano from Diener electronic GmbH+Co. KG, Ebhausen, Germany. The system is operated at a constant frequency of 13.56 MHz and at 200 W. The gas consists of 10 vol.-% of $O_2$ and 90 vol.-% of Ar. Further, the plasma has a temperature of 30° C. and a pressure of 10 mbar. Accordingly, the glass vial is not heated above 30° C. for the functionalization procedure. The MED-36 comprises a catalyst which supports curing of the functionalization emulsion.

Example 3 (According to the Invention)

Preparation of Functionalizing Emulsion:
181.20 g of high purity water (water for injection) are provided in a beaker. 15 g of MED-6670 A and 15 g of MED-6670 B, both from NuSil, are added to the beaker and the obtained composition is stirred for 1 h with a magnetic stirrer at ambient temperature of 20° C. The thus obtained emulsion is ready for use.

Functionalization with Emulsion:
A commercially available glass vial of the type "Vial 2.00 ml Fiolax clear" from Schott AG, which is further of the type 2R according to DIN/ISO 8362, is provided. The surface of this vial does not have any coating or functionalization. This vial is washed as described below. The washed vial is immersed with its bottom first into the functionalizing emulsion which has been prepared as set out above, at a velocity of 30 cm/min. Therein, the head region of the vial, including the vial opening, is not immersed into the emulsion in order to prevent contacting the interior surface of the vial with the emulsion. The vial is kept in the composition for 1 s. Afterwards, the vial is retracted from the emulsion at a velocity of 10 cm/min. Subsequently, the vial is kept as it is for 10 s at ambient temperature of 20° C. Then the vial is placed with its bottom onto an absorbent substrate such as a paper towel. Then the functionalizing emulsion which has been applied to the vial is cured by treating the solution for 30 s with a plasma.

This plasma is obtained from a gas using the low-pressure plasma system of the type Nano from Diener electronic GmbH+Co. KG, Ebhausen, Germany. The system is operated at a constant frequency of 13.56 MHz and at 100 W. The gas consists of 20 vol.-% of $O_2$ and 80 vol.-% of Ar. Further, the plasma has a temperature of 35° C. and a pressure of 15 mbar. Accordingly, the glass vial is not heated above 35° C. for the functionalization procedure. The MED-6670 A and MED-6670 B comprise a catalyst which supports curing of the functionalization emulsion.

Comparative Example 1 (not According to the Invention)

A commercially available glass vial of the type "Vial 2.00 ml Fiolax clear" from Schott AG, which is further of the type 2R according to DIN/ISO 8362, is provided and used as reference. The surface of this vial does not have any coating or functionalization.

Comparative Example 2 (not According to the Invention)

A commercially available glass vial of the type "Vial 2.00 ml Fiolax clear" from Schott AG, which is further of the type 2R according to DIN/ISO 8362, and which has been washed as described below is coated on its exterior surface with MED10-6670 from NuSiL. The coated vial is dried for 10 min at 350° C. in an oven. No plasma treatment is applied.

Comparative Example 3 (not According to the Invention)

A glass vial of the type 2R according to DIN/ISO 8362 is washed as described below and then coated on its exterior surface with polyimide. No plasma treatment is applied. Instead, curing is conducted in an oven for 30 minutes at 300° C.

Evaluation
For each of the examples 1 to 3 and the comparative examples 1 to 3, the contact angle for wetting with water and the coefficient of dry sliding friction are determined on the exterior surface of the vial body in accordance with the above measurement methods, respectively. The results are shown in Table 1.

TABLE 1

Characterization of the exterior surfaces of the glass vials of the examples and comparative examples by their contact angles for wetting with water and coefficients of dry sliding friction, in each case prior to any post treatment

| Example | Contact angle for water [°] | Coefficient of dry sliding friction |
|---|---|---|
| Example 1 | 105 | 0.06 |
| Example 2 | 99 | 0.01 |
| Example 3 | 77 | 0.28 |
| Comparative example 1 | <10 | 0.5 |
| Comparative example 2 | 70 | 0.28 |
| Comparative example 3 | 72 | 0.16 |

Further, 10,000 of the vials of each example and comparative example, respectively, are processed on a standard pharmaceutical filling line and thus, filled with an influenza vaccine. Table 2 below shows an evaluation of the vials regarding their tendency to being damaged or even break on the filling line. Here, ++ means that no or only very few vials are being damaged or broken, + means that few vials are being damaged or broken, – means that damages to vials and broken vials occur more often than for +, –– means that damages to vials and broken vials occur more often than for –. Further, the maximum temperature of the glass vials during functionalization and the duration of the curing procedure of the composition for functionalization are summarized for the examples and comparative examples in the Table 2.

TABLE 2

Comparison of the tendency of the glass vials to be damaged on the filling line, the maximum temperature of the glass vials during functionalization and the duration of the curing procedure of the composition for functionalization, each for the examples and comparative examples

| Example | Low tendency to damages on filling line | Maximum temperature of glass vial during functionalization [° C.] | Duration of curing of the composition for functionalization |
|---|---|---|---|
| Example 1 | ++ | 25 | 10 s |
| Example 2 | ++ | 30 | 20 s |
| Example 3 | + | 35 | 30 s |
| Comparative example 1 | –– | / | 0 s |
| Comparative example 2 | – | 350 | 10 min |
| Comparative example 3 | – | 300 | 30 min |

It can be concluded from the results presented in Table 2 that only the inventive examples provide glass vials with a low tendency to be damaged or broken on the filling line by rather short low-temperature processes. This makes these processes particularly suitable for functionalizing glass containers which include heat-sensitive components, such as a syringe which has a hypodermic needle glued into its tip. Such a syringe cannot be functionalized by any of the processes of the comparative examples 2 and 3 without damaging the syringe. Further in comparison to the processes of the comparative examples 2 and 3 which include thermal curing steps, the inventive processes of the examples 1 to 3 are particularly suitable for functionalizing non-planar, 3D-bodies because the plasma treatment results in a comparably fast immobilization of the siloxanes which are thus, stopped from flowing. In consequence, a tendency to contaminate the container interior is lower for the processes of the examples 1 to 3. In addition, the functionalized surface shows a more uniform coefficient of dry sliding friction across its area.

Further, the vials of the examples and comparative examples are studied for their optical characteristics which may influence an optical inspection of the vials, in particular for pharmaceutically relevant particles, after being filled with a vaccine and being closed. These studies are conducted prior to filling the vials. Here, the increase of the haze by the functionalization/coating and the transmission coefficient (T) of the vials for blue light of wavelength 450 nm are determined in accordance with the above measurement methods. The results are provided in the Table 3 below. Column 2 shows the increase of the haze by the functionalization/coating with respect to the untreated vial which corresponds to comparative example 1.

TABLE 3

Optical characteristics of the vials of the examples and the comparative examples

| Example | Increase of haze [%] | T at 450 nm |
|---|---|---|
| Example 1 | <0.3 | 0.85 |
| Example 2 | <0.3 | 0.85 |
| Example 3 | <0.3 | 0.85 |
| Comparative example 1 | / | 0.85 |
| Comparative example 2 | 6 | 0.86 |
| Comparative example 3 | 3 | 0.74 |

Figure 10:
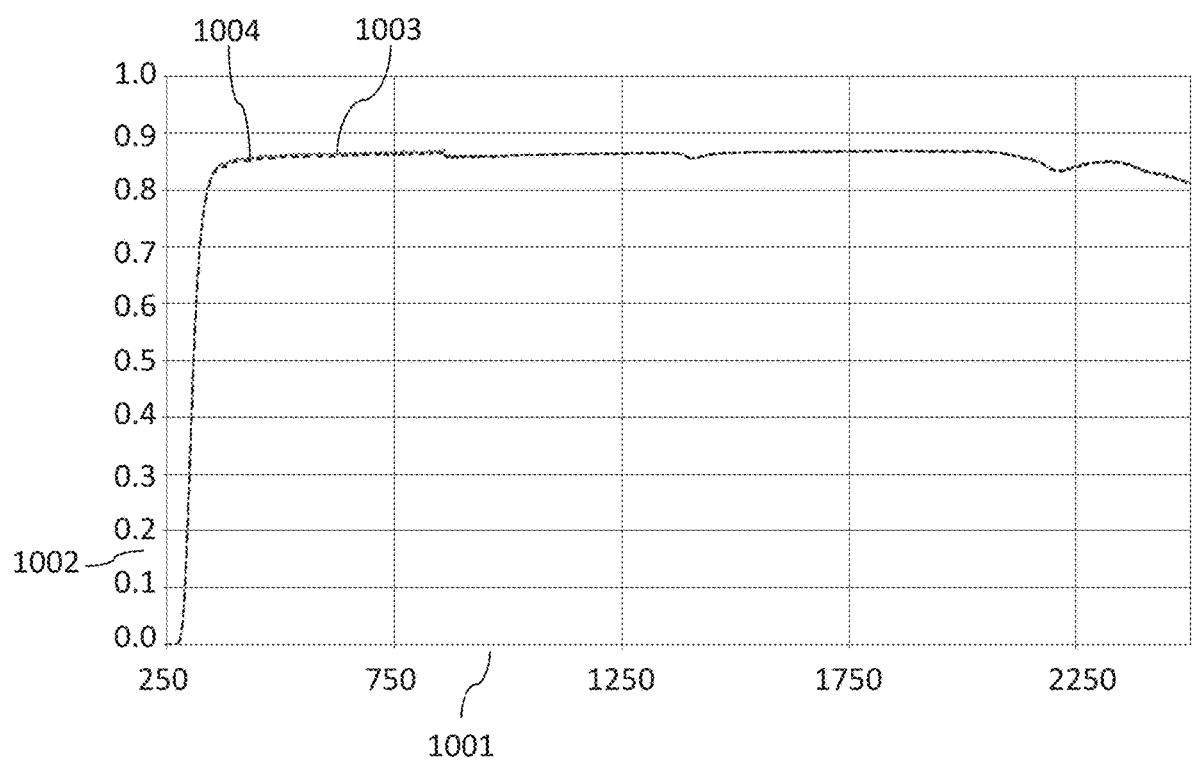
FIG. 10 shows results of measurements of the transmission coefficient of vials according to the example 1 and the comparative example 1.

In addition to Table 3, FIG. 10 shows the transmission coefficients of the empty vials of the examples 1 to 3 after functionalization and of empty vials of comparative example 1 as reference across a broad spectral range. From this figure, it can be seen that the functionalization measures according to the examples 1 to 3 do not significantly deteriorate the transmission coefficient in the studied spectral range.

Figure 7A:
FIG. 7A shows a microscope image of the result of a scratch test performed on a vial of comparative example 1.
Figure 7B:
FIG. 7B shows a microscope image of the result of a scratch test performed on a vial of example 1.

For further studies, functionalized surfaces of vials according to the example 1 and unfunctionalized surfaces of vials according the comparative example 1 have been subjected to a scratch test which is described in detail in the above measurement methods section. Typical results of these tests are shown in the FIGS. 7A and 7B. Therein, FIG. 7A shows an unfunctionalized surface of a vial according to comparative example 1 after having been subjected to the scratch test. FIG. 7B shows a functionalized vial surface according to example 1 after having been subjected to the scratch test. In these figures, the test force with which the friction partner is pushed against the vial surface is increased linearly from 0.1 N (at the left margins of the figures) up to 30 N (at the right margins of the figures). As FIGS. 7A and 7B show typical results of the scratch test studies, it can be concluded that the scratch resistance of the vial surfaces which have been functionalized according to the invention have been greatly improved with respect to the unfunctionalized reference vial.

Post-Treatment

For further studies, vials of the example 1 and of the comparative example 1 as reference are subjected to three different kinds of post-treatment, i.e. a washing procedure, a depyrogenation procedure and a freeze drying. These kinds of post-treatment are described below. The washing procedure is the same as used prior to functionalizing/coating the vials in the examples 1 to 3 and of the comparative examples 1 and 2.

Washing:

A HAMO LS 2000 washing machine is applied for the washing procedure. The HAMO LS 2000 is connected to the purified water supply. Further, the following devices are used.

cage 1: 144 with 4 mm nozzles
cage 2: 252 with 4 mm nozzles
drying cabinet from Heraeus (adjustable up to 300° C.)

The tap is opened. Then the machine is started via the main switch. After conducting an internal check, the washing machine shows to be ready on the display. Program 47 is a standard cleaning-program which operates with the following parameters:

pre-washing without heating for 2 min
washing at 40° C. for 6 min
pre-rinsing without heating for 5 min
rinsing without heating for 10 min
end-rinsing at without heating for 10 min
drying without heating for 5 min The holder for the vials in the cages 1 and 2 have to be adjusted considering the size of the vials in order to obtain a distance of the nozzle of about 1.5 cm. The vials to be washed are placed on the nozzles with the head first. Subsequently, the stainless steel mesh is fixed on the cage. The cage is oriented to the left and pushed into the machine. Then the machine is closed. Program 47 (GLAS040102) is selected and then the HAMO is started via START. After the program has finished (1 h), the cages are taken out and the vials are placed with their opening facing downwards in drying cages. A convection drying cabinet with ambient air filter is applied for the drying. The drying cabinet is adjusted to 300° C. The vials are placed into the drying cabinet for 20 min. After the vials have cooled down, they are sorted into appropriate boxes.

Depyrogenation:

The vials are depyrogenised by placing them in an oven which is heated to 350° C. This temperature is kept constant for 1 h. Subsequently, the vials are taken out of the oven and left to cool down.

Freeze Drying:

The vials are freeze dried by storing them for 4 hours at −70° C.

Evaluation after Post-Treatment

Figure 8:
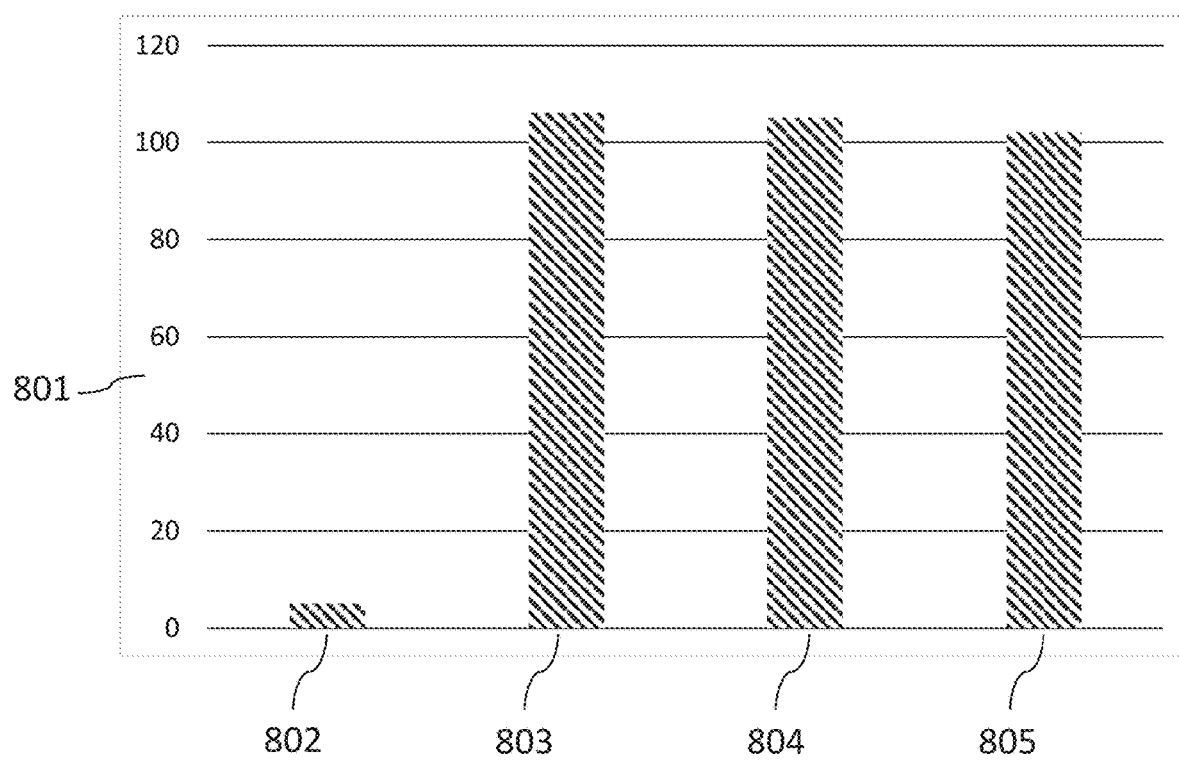
FIG. 8 shows a diagram with results of measurements of the contact angle for wetting with water of vials of example 1 and comparative example 1.

Vials of the example 1 have been subjected either to the above washing procedure or to the depyrogenation procedure. Afterwards, the contact angle for wetting with water of the exterior surfaces of the vials in their tubular body regions have been measured. The results are shown in FIG. 8. This figure compares, from left to right, the contact angle of vials of comparative example 1 (without any post treatment), of example 1 without post-treatment, of example 1 after depyrogenation, and of example 1 after washing. It is demonstrated that the functionalization of example 1 withstands the washing procedure as well as the depyrogenation procedure very well.

Further, vials according to example 1 and according the comparative example 1 have been further studied for their coefficient of dry sliding friction. In particular, the preceding coefficient has been measured without any post-treatment, after depyrogenation and after freeze drying the vials. The results for vials of example 1 can be seen in the left-hand part of FIG. 9. The results show that the coefficient is not increased by any of the two kinds of post-treatment, rather it is decreased even further. In conclusion, the functionalization withstands both of the applied post-treatments. For further studies, vials according to example 1 have been washed as described above. Then the washed vials have been studied for their coefficients of dry sliding friction without further post-treatment and after depyrogenation. The results are shown in the middle part of FIG. 9. It can ben seen that the functionalization according to the invention even withstands a combination of washing and depyrogenation very well. As a reference, vials of comparative example 1 have been washed as described above. The right-hand part of FIG. 9 shows measurement results of the coefficients of dry sliding friction without further post-treatment and after depyrogenation.

Figure 9:
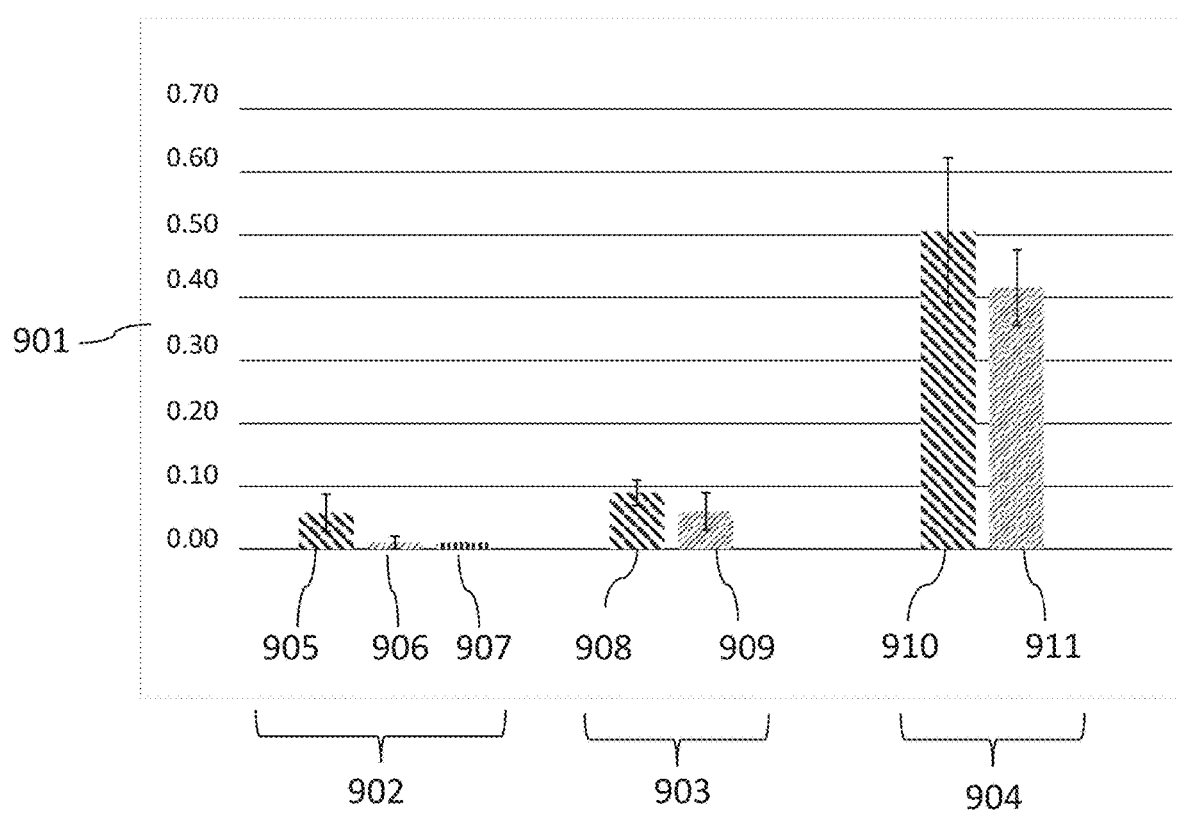
FIG. 9 shows a diagram with results of measurements of the coefficient of dry sliding friction of vials of example 1 and comparative example 1.

As shown in FIGS. 8 and 9, the functionalization according to the invention withstands a washing procedure, depyrogenation as well as freeze drying, all of which are procedures which are typically used for treating pharmaceutical vials. Further studies have shown that the interior surfaces of vials which have been functionalized on their exterior surface according to the invention are not contaminated by the functionalization composition due to the washing procedure.

Even further tests have been conducted, in that vials which have been functionalized on their exterior surfaces according to the invention have been freeze dried as set out above. Prior to and after this procedure the functionalized surfaces have been checked for damages and defects under an optical microscope at a magnification of 5 to 20 times. It has been observed that no defects or damages have been caused to the functionalized surface by the freeze drying procedure.

FIG. 1 shows a flow chart of a process 100 provided according to the invention for making a functionalized hollow body 300. The process 100 comprises a process step a) 101 in which a commercially available glass vial of the type "Vial 2.00 ml Fiolax clear" from Schott AG, which is further of the type 2R according to DIN/ISO 8362, is provided. A process step b) 102 of partially superimposing a layer of glass 304 of the vial with a functionalizing emulsion is conducted as described above for example 1. Also the subsequent process step c) 103 of at least partially contacting the functionalizing emulsion—as functionalizing composition precursor—with a plasma is conducted as described in the context of example 1. Thereby, the functionalized hollow body 300 is obtained. In particular, a functionalizing composition 305 is obtained from the functionalizing emulsion via at least partially crosslinking the siloxanes in the emulsion.

Figure 2:
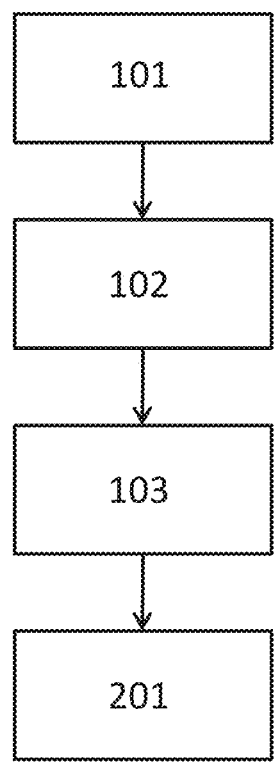
FIG. 2 shows a flow chart of a further process according to the invention for making a functionalized hollow body.

FIG. 2 shows a flow chart of a further process 200 provided according to the invention for making a functionalized hollow body 300. The process 200 of FIG. 2 comprises the process steps a) 101 to c) 103 of the process 100 according to FIG. 1 and further, a process step d) 201 of depyrogenising the functionalized hollow body 300 in accordance with the above described depyrogenation process.

Figure 3:
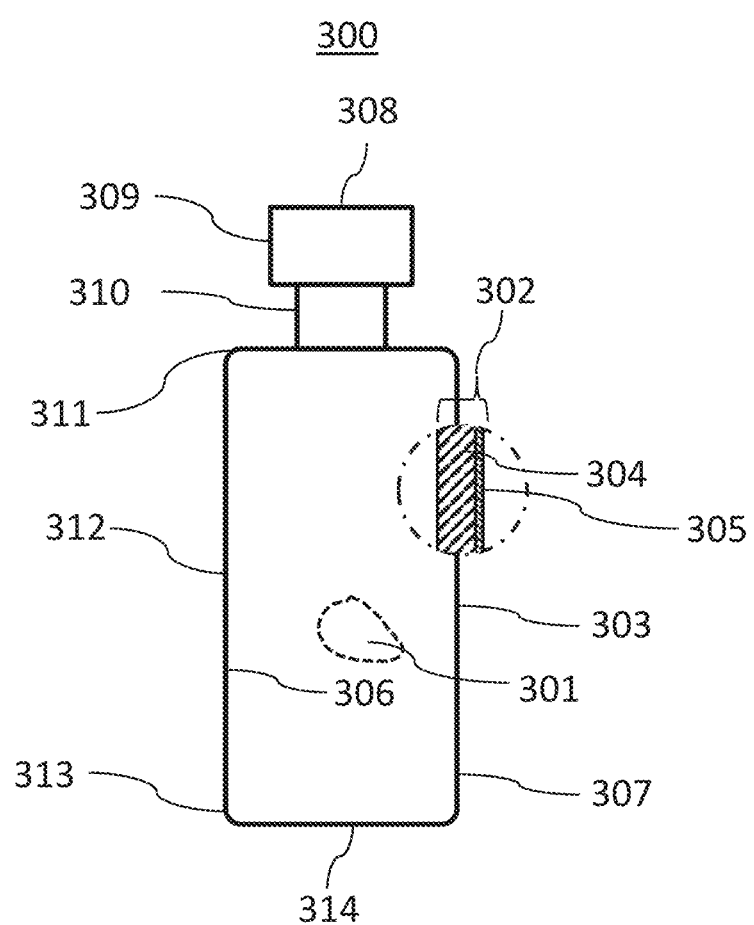
FIG. 3 shows a schematic depiction of a hollow body according to the invention.

FIG. 3 shows a schematic depiction of a hollow body 300 provided according to the invention. The hollow body 300 comprises a wall 302 which partially surrounds an interior volume 301 of the hollow body 300. The wall 302 surrounds the interior volume 301 only partially in that the hollow body 300 comprises an opening 308. The wall 302 forms from top to bottom in the FIG. 3: a top region of the hollow body 300, which consists of a flange 309 and a neck 310; a body region 312, which follows the top region via a shoulder 311; and a bottom region 314, which follows the body region 312 via a heel 313. Here, the body region 312 is a lateral region of the hollow body 300 in form of a hollow cylinder. The wall 302 comprises a layer of glass 304 and a wall surface 303, wherein the layer of glass 304 extends across the full area of the wall surface 303. The wall surface 303 consists of an interior surface 306 which faces the interior volume 301, and an exterior surface 307 which faces away from the interior volume 301. Throughout the body region 312, a functionalizing composition 305 adjoins the layer of glass 304 on a side of the layer of glass 304 which faces away from the interior volume 301. The functionalizing composition 305 comprises 99.95 wt.-% of one or more siloxanes, and 0.05 wt.-% of a catalyzing substance which is suitable for catalyzing a crosslinking of the one or more siloxanes, the wt.-% being based on the weight of the functionalizing composition 305. Here, the functionalizing composition 305 is covalently bonded to the layer of glass 304 via Si—O-bonds. Further, the siloxanes of the functionalizing composition 305 are at least partially cross-linked. Further, the catalyzing substance is based on platinum. The hollow body 100 is a vial for packaging a pharmaceutical composition. Further, the hollow body 300 shown in FIG. 3 is a functionalized hollow body 300 which is obtainable by a process 100 according to the invention.

Figure 4:
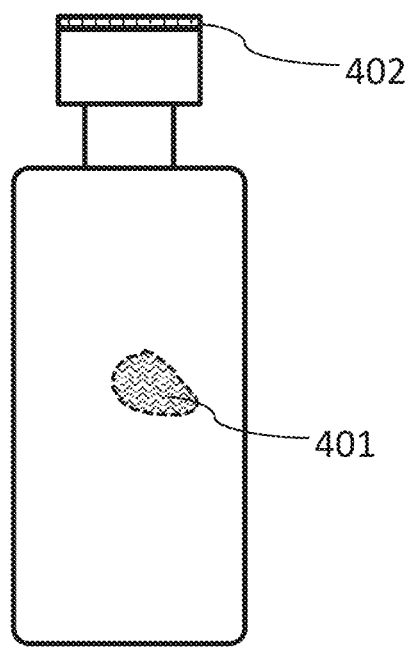
FIG. 4 shows a schematic depiction of a closed hollow body according to the invention.

FIG. 4 shows a schematic depiction of a closed hollow body 400 provided according to the invention. This closed hollow body 400 is obtainable by filling the hollow body 300 of FIG. 3 with a pharmaceutical composition 401 and closing the opening 308 with a lid 402. Here, the pharmaceutical composition 401 is a vaccine.

Figure 5:
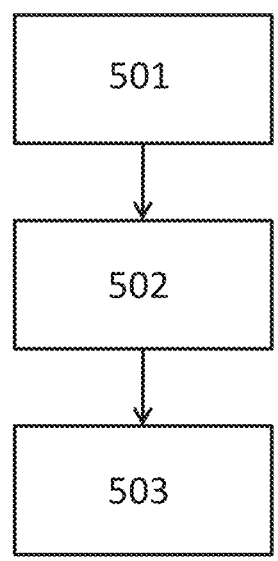
FIG. 5 shows a flow chart of a process according to the invention for packaging a pharmaceutical composition.

FIG. 5 shows a flow chart of a process provided according to the invention for packaging a pharmaceutical composition. In a process step A) 501, the hollow body 300 according to FIG. 3 is provided. In a process step B) 502, a pharmaceutical composition 401 is filled into the interior volume 301 of the hollow body 300, and in a process step C) 503 the opening 308 of the hollow body 300 is closed, thereby obtaining the closed hollow body 400 of FIG. 4.

Figure 6:
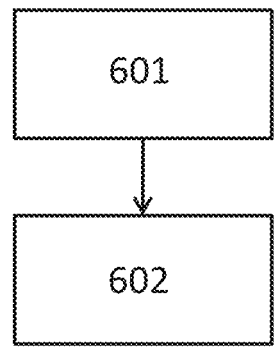
FIG. 6 shows a flow chart of a process according to the invention for treating a patient.

FIG. 6 shows a flow chart of a process 600 provided according to the invention for treating a patient. This process 600 comprises the process steps of: A. 601 providing the closed hollow body 400 of FIG. 4, opening the closed hollow body 400 by penetrating the lid 402 with a needle of a syringe, filling the syringe with the vaccine; and B. 602 administering the vaccine subcutaneously to a patient using the syringe.

FIG. 7A shows a microscope image of the result of a scratch test performed on a vial of comparative example 1. In the figure, the applied force increases linearly from 0.1 N on the left-hand margin to 30 N on the right-hand margin.

FIG. 7B shows a microscope image of the result of a scratch test performed on a vial of example 1. In the figure, the applied force increases linearly from 0.1 N on the left-hand margin to 30 N on the right-hand margin.

FIG. 8 shows a diagram with results of measurements of the contact angle for wetting with water 800 of vials of example 1 and comparative example 1. The bar 802 shows the measurement results for vials according to comparative example 1 without any post-treatment which is used as a reference. Bar 803 shows the results for vials of example 1 without post-treatment, bar 804 for vials of example 1 after depyrogenation, and bar 805 for vials of example 1 after the washing procedure.

FIG. 9 shows a diagram with results of measurements of the coefficient of dry sliding friction 901 of vials of example 1 and comparative example 1. In the left-hand part 902 of the figure, bar 905 shows the coefficient of dry sliding friction 901 of vials according to example 1 without post-treatment, bar 906 after depyrogenation, and bar 907 after freeze drying. In the middle part 903 of the figure, bar 908 shows the coefficient of dry sliding friction 901 of vials according to example 1 after washing without further post-treatment, and bar 909 after washing and depyrogenation. In the right-hand part 902 of the figure, bar 910 shows the coefficient of dry sliding friction 901 of vials according to comparative example 1 after washing without further post-treatment, and bar 911 after washing and depyrogenation.

FIG. 10 shows results of measurements of the transmission coefficient 1002 of vials according to the example 1 and the comparative example 1 over the wavelength in nm 1001. In the diagram, 1003 denotes the measurement results for the example 1 and 1004 denotes the results for comparative example 1. All these results are so close to each other that the corresponding graphs appear practically as one in the diagram. The dip at 865 nm is a measurement artefact.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE NUMERALS

100 process provided according to the invention for making a hollow body
101 process step a)
102 process step b)
103 process step c)
200 process provided according to the invention for making a hollow body
201 process step d)
300 hollow body/functionalized hollow body provided according to the invention
301 interior volume
302 wall
303 wall surface
304 layer of glass
305 functionalizing composition
306 interior surface
307 exterior surface
308 opening
309 flange
310 neck
311 shoulder
312 body region
313 heel
314 bottom region
400 closed hollow body provided according to the invention
401 pharmaceutical composition
402 lid
500 Process provided according to the invention for packaging a pharmaceutical composition
501 process step A)
502 process step B)
503 process step C)
600 process provided according to the invention for treating a patient
601 process step A.
602 process step B.
801 contact angle for wetting with water in °
802 vials of comparative example 1 without post-treatment
803 vials of example 1 without post-treatment
804 vials of example 1 after depyrogenation
805 vials of example 1 after washing procedure
901 coefficient of dry sliding friction
902 left-hand part (measurement results for example 1)
903 middle part (measurement results for example 1 after washing)
904 right-hand part (measurement results for comparative example 1 after washing)
905 measurement results for example 1 without further post-treatment
906 measurement results for example 1 after depyrogenation
907 measurement results for example 1 after freeze drying
908 measurement results for example 1 after washing without further post-treatment
909 measurement results for example 1 after washing and depyrogenation
910 measurement results for comparative example 1 after washing without further post-treatment
911 measurement results for comparative example 1 after washing and depyrogenation
1001 wavelength in nm
1002 transmission coefficient
1003 measurement results for example 1
1004 measurement results for comparative example 1

What is claimed is:

1. A hollow body, comprising:
   a wall which at least partially surrounds an interior volume of the hollow body, the wall comprising a layer of glass and having a wall surface comprising a surface region; and
   a functionalizing composition superimposing the layer of glass at least in the surface region on a side of the layer of glass which is facing away from the interior volume, the functionalizing composition comprising one or more siloxanes and a catalyzing substance which is suitable for catalyzing a crosslinking of the one or more siloxanes.

2. The hollow body according to claim 1, wherein the functionalizing composition comprises the catalyzing substance at a proportion in a range from more than 0 up to less than 1 wt.-%, based on the functionalizing composition.

3. The hollow body according to claim 1, wherein the catalyzing substance comprises at least one of Pt or a peroxide.

4. The hollow body according to claim 1, wherein the hollow body is closed and the interior volume comprises a pharmaceutical composition.

5. The hollow body according to claim 1, wherein at least one of the one or more siloxanes is a polyalkylsiloxane.

6. The hollow body according to claim 1, wherein between the functionalizing composition and the wall surface there is a Si—O-bond.

7. The hollow body according to claim 1, wherein the one or more siloxanes is crosslinked.

8. The hollow body according to claim 1, wherein a coefficient of dry sliding friction of the wall surface at least in the surface region is less than 0.3.

9. The hollow body according to claim 1, wherein a thickness of the functionalizing composition is in the range of 50 to 750 nm.

10. The hollow body according to claim 1, wherein a contact angle for water of the wall surface at least in the surface region is at least 70°.

11. The hollow body according to claim 1, wherein the hollow body has a transmission coefficient for a transmission of light of a wavelength in a range from 400 nm to 2300 nm through the hollow body via the surface region of more than 0.7.

12. The hollow body according to claim 1, wherein the hollow body has a haze for a transmission of light through the hollow body via the surface region in a range from 5 to 50%.

13. The hollow body according to claim 1, wherein the hollow body is a container.

14. The hollow body according to claim 1, wherein the container is a packaging container for at least one of a medical packaging good or a pharmaceutical packaging good.

15. The hollow body according to claim 1, wherein the wall surface comprises an interior surface which faces the interior volume and an exterior surface which faces away from the interior volume, wherein the exterior surface comprises the surface region.

16. The hollow body according to claim 15, wherein the layer of glass is superimposed with the functionalizing composition across at least 10% of the exterior surface.

17. The hollow body according to claim 1, wherein the hollow body is obtainable by a process comprising as process steps:

a) providing a hollow body precursor comprising the wall which at least partially surrounds the interior volume, the wall comprising the layer of glass and having the wall surface comprising the surface region;

b) at least partially superimposing the layer of glass in the surface region with a functionalizing composition precursor on a side of the layer of glass which faces away from the interior volume, the functionalizing composition precursor comprising the one or more siloxanes; and c) at least partially contacting the functionalizing composition precursor with a plasma, thereby obtaining the functionalized hollow body comprising the functionalizing composition which at least partially superimposes the layer of glass in the surface region on the side of the layer of glass which faces away from the interior volume.

18. The hollow body according to claim 17, wherein the plasma is obtainable from a plasma precursor which is selected from the group consisting of Ar, $N_2$, $O_2$, air, and a combination of at least two thereof.

19. The hollow body according to claim 17, wherein the functionalizing composition precursor comprises the one or more siloxanes in total at a proportion in a range from 1 to 50 wt.-%, based on the total weight of the functionalizing composition precursor.

20. The hollow body according to claim 17, wherein the functionalizing composition precursor further comprises a vehicle at a proportion in a range from 45 to 99 wt.-%, based on the total weight of the functionalizing composition precursor.

* * * * *